United States Patent
Roy-Auberger et al.

(10) Patent No.: US 6,515,035 B2
(45) Date of Patent: Feb. 4, 2003

(54) PROCESS FOR CONVERTING SYNTHESIS GAS IN THE PRESENCE OF A CATALYST COMPRISING A GROUP VIII ELEMENT DISPERSED ON A SUPPORT BASED ON ALUMINA MODIFIED BY AQUEOUS IMPREGNATION OF QUATERNARY AMMONIUM SILICATE

(75) Inventors: Magalie Roy-Auberger, Bourgoin Jallieu (FR); Patrick Euzen, Paris (FR); Vincent Zozaya, Rueil-Malmaison (FR); Roberto Zennaro, Venice (IT); Giovanni Pederzani, San Donato Milanese (IT)

(73) Assignees: Institute Francais du Petrole, Rueil Malmaison Cedex (FR); AGIP Petroli S.p.A., Rome (IT); ENI S.p.A., Rome (IT)

( * ) Notice: Subject to any disclaimer, the term of this patent is extended or adjusted under 35 U.S.C. 154(b) by 50 days.

(21) Appl. No.: 09/983,325

(22) Filed: Oct. 24, 2001

(65) Prior Publication Data

US 2002/0177630 A1 Nov. 28, 2002

(30) Foreign Application Priority Data

Oct. 24, 2000 (FR) .............................. 00 13703

(51) Int. Cl.$^7$ ............................ C07C 27/00; B01J 31/00
(52) U.S. Cl. ...................... 518/715; 518/700; 518/717; 518/721; 502/164
(58) Field of Search ................................ 518/700, 715, 518/717, 721; 502/164

(56) References Cited

U.S. PATENT DOCUMENTS 4,762,815 A  8/1988  Banks et al.
4,766,101 A * 8/1988  Nortier et al. ............... 502/164

FOREIGN PATENT DOCUMENTS

EP    0 184 506 A    6/1986
EP    0 230 717 A    8/1987

\* cited by examiner

*Primary Examiner*—Jafar Parsa
(74) *Attorney, Agent, or Firm*—Millen, White, Zelano & Branigan, P.C.

(57) ABSTRACT

A process is described for converting synthesis gas in the presence of a catalyst comprising at least one group VIII element dispersed on a support comprising alumina modified by aqueous impregnation of quaternary ammonium silicate and comprising in the range of about 3% by weight to about 9.5% by weight of silica. Said support can optionally also comprise at least one oxide selected from the group formed by rare earth oxides, alkaline-earth oxides and zirconium oxide.

21 Claims, No Drawings

PROCESS FOR CONVERTING SYNTHESIS GAS IN THE PRESENCE OF A CATALYST COMPRISING A GROUP VIII ELEMENT DISPERSED ON A SUPPORT BASED ON ALUMINA MODIFIED BY AQUEOUS IMPREGNATION OF QUATERNARY AMMONIUM SILICATE

The present invention relates to a process for synthesising hydrocarbons from a mixture comprising CO—(CO$_2$)—H$_2$ (i.e., a mixture comprising CO—H$_2$ and possibly CO$_2$, known as synthesis gas). This process comprises using a catalyst comprising at least one group VIII metal, preferably cobalt, supported on a support based on alumina modified by silica.

PRIOR ART

The skilled person is aware that synthesis gas can be converted to hydrocarbons in the presence of a catalyst containing transition metals. Such conversion, carried out at high temperatures and under pressure, is known in the literature as the Fischer-Tropsch synthesis. Metals from group VIII of the periodic table such as iron, ruthenium, cobalt and nickel catalyse the transformation of CO—(CO$_2$)—H$_2$ mixtures (i.e., a mixture of CO—H$_2$ and possibly CO$_2$, known as synthesis gas) to liquid and/or gaseous hydrocarbons.

Different methods have been described and developed in the prior art that are intended to improve the preparation of Fischer-Tropsch catalysts based on cobalt supported on different supports. The most widely used supports are alumina, silica and titanium dioxide, occasionally modified by additional elements.

International patent application WO-A-99/39825 describes the use of a support comprising a titanium dioxide base onto which a binder constituted by silica and alumina has been incorporated. The mechanical properties of the catalyst obtained are improved, in particular for use in a slurry reactor.

WO-A-99/42214 describes adding a stabilising element to an Al$_2$O$_3$ support used to prepare a catalyst that is active in the Fischer-Tropsch process. The aim is to avoid dissolving the alumina in the wake of an acid or aqueous attack. The stabiliser can be Si, Zr, Cu, Mn, Ba, Co, Ni and/or La. It can substantially reduce the solubility of the support in acidic or neutral aqueous solutions. A preferred method for introducing the stabiliser, in particular silica, is to graft on organic compounds such as TEOS (triethoxysilane) or TMOS (trimethoxysilane) onto a pre-formed alumina. The quantities of silica that are deposited are preferably in the range of of 0.06 at. Si/nm$^2$ (atoms of silicon per square nanometer of specific surface area of the support) to 2.8 at. Si/nm$^2$, and optionally up to 14.8 at. Si/nm$^2$ for a Puralox alumina with a specific surface area of 150 m$^2$/g.

French patent application 00/01168 claims a process for synthesising hydrocarbons from a mixture comprising carbon monoxide and hydrogen in the presence of a catalyst comprising at least one group VIII element supported on a silica-alumina prepared by co-precipitation and calcined at a temperature in the range of of about 500° C. to about 1200° C. to obtain a silica-alumina with a specific surface area of less than 260 m$^2$/g.

European patent application EP-A-0 184 506 describes a process for producing alumina-based catalyst supports with improved durability. The production process is characterized in that in a first step, the support is impregnated with an aqueous solution of quaternary ammonium silicate then dried, and the impregnated support is then calcined.

SUMMARY OF THE INVENTION

The present invention concerns a process for synthesising hydrocarbons from a mixture comprising carbon monoxide and hydrogen CO—H$_2$, and possibly carbon monoxide CO$_2$, in the presence of a catalyst comprising at least one group VIII metal, supported on a support comprising alumina modified by impregnating with an aqueous solution of quaternary ammonium silicate. The catalyst is preferably used in suspension in a liquid phase in a perfectly stirred autoclave type three-phase reactor (slurry bubble column). It is also suitable for use in a fixed bed.

DETAILED DESCRIPTION OF THE INVENTION

The Applicant has surprisingly discovered that a support comprising alumina modified by impregnation with an aqueous quaternary ammonium silicate solution such that the quantity of silica introduced into the support is in the range of about 3% to about 10% by weight with respect to the finished support, after impregnating with at least one element from group VIII, can produce a catalyst that is particularly active in a process for synthesising hydrocarbons from a mixture comprising carbon monoxide and hydrogen. Further, said catalyst has improved mechanical properties, in particular when, as is preferable, it is used in suspension in a liquid phase in a three-phase reactor, and it has better resistance to attrition phenomena, without the need to introduce silica via a precursor, i.e., primarily chemically bonded to the support during the step for adding said silica precursor. Simple dry impregnation is suitable for introducing said precursor.

The support used in the process of the invention can, for example, preferably be prepared using the operating procedure described in EP-B-0 184 586, i.e., as follows:

In a first step, the support comprising the alumina (i.e., usually at least 55% by weight, preferably at least 65% by weight, more preferably at least 80% by weight and still more preferably at least 90% by weight of alumina) is impregnated with an aqueous solution of quaternary ammonium silicate solution, preferably selected from the group formed by: tetramethylammonium silicate, tetraethylamrnonium silicate, and tetrahydroxyammonium silicate. In a preferred implementation of the invention, the alumina used is a gamma alumina. In a preferred implementation of this preparation step of the invention, the support is dry impregnated, i.e., the total volume of the solution used is approximately equal to the total pore volume of the support;

In a second step, the impregnated support is dried at a temperature in the range of 80° C. to 500° C. to transform the compounds used into precursors of the desired oxides in the dispersed state on the alumina support.

In a third step, the support dried during the second step is calcined at a temperature in the range of 500° C. to 1000° C., preferably in the range of 600° C. to 900° C. for a period in the range of 1 to 24 hours.

The supports, also termed "silicated aluminas" used in the present invention comprise in the range of about 3% by weight to about 9.5% by weight of SiO$_2$, preferably in the range of about 4% by weight to about 9.5% by weight, more preferably in the range of about 4.5% by weight to about 9% by weight of silica, and still more preferably in the range of 5% by weight to 8% by weight of silica with respect to a support comprising alumina and silica. These amounts correspond to quantities of atoms of $Si/nm^2$ in the range of about 2 to about 6 atoms of $Si/nm^2$, preferably in the range of about 2.5 to about 6 atoms of $Si/nm^2$, more preferably in the range of about 3.0 to about 5.7 atoms of $Si/nm^2$ and still more preferably in the range of about 3.3 to about 5.1 atoms of $Si/nm^2$ for a support with a specific surface area of 160 $m^2/g$. In this application, the modifying element of the support, such as silica, is chemically bonded to the support.

In a variation of the catalyst preparation process of the invention, its is possible to introduce into the support before, after or simultaneously with the quaternary ammonium silicate, at least one precursor of an oxide of an element selected from the group formed by: rare earths, alkaline-earths and zirconium, which result in the corresponding oxides by thermal decomposition, i.e., to oxides of the rare earth or alkaline-earth and/or zirconium, dispersed over the support. The overall quantity of said oxides in the catalyst of the invention is preferably less than 50% by weight, more preferably in the range of 1% by weight to 30% by weight, and more preferably in the range of 3% by weight to 15% by weight.

Preferably, the quaternary ammonium silicate and optional rare earth, alkaline-earth and zirconium precursors are impregnated onto the formed support.

Preferably, the support used before impregnating the aqueous quaternary ammonium silicate solution is a gamma alumina and is in the form of a fine calibrated powder obtained, for example, by spray drying and with a grain size of less than 800 $\mu M$ (microns), preferably in the range of 10 to 500 $\mu m$, more preferably in the range of 10 to 300 $\mu M$, and still more preferably in the range of 20 to 150 $\mu m$. The catalyst of the invention is optimised in use when in the presence of a liquid phase in a slurry bubble column.

In a further use, the support used before impregnating with the aqueous quaternary ammonium silicate solution is an alumina, preferably a gamma alumina in the form of particles (spheres or extrudates) with an equivalent diameter in the range of 1 to 10 mm, preferably in the range of 2 to 8 mm, more preferably in the range of 2 to 5 mm. The catalyst of the invention is then used in a fixed bed.

After impregnation of the quaternary ammonium silicate and optional rare earth, alkaline-earth or zirconium precursors, then drying and calcining, the support obtained has a specific surface area in the range of 100 to 300 $m^2/g$, preferably in the range of 130 to 300 $m^2/g$, more preferably in the range of 160 to 250 $m^2/g$ and still more preferably in the range of 170 to 220 $m^2/g$.

The catalyst is constituted by at least one element from group VIII supported on an alumina modified by impregnation with an aqueous quaternary ammonium silicate solution and optional rare earth, alkaline-earth and zirconium precursors.

The element from group VIII of the periodic table is preferably selected from iron, cobalt and ruthenium. More preferably, the group VIII metal is cobalt.

One preferred technique for incorporating at least one group VIII element into the catalyst of the invention is impregnation of an aqueous solution of a precursor of the element from group VIII of the periodic table, preferably cobalt, for example an aqueous solution of salts such as cobalt nitrate. The weight content of the group VIII metal with respect to the total catalyst weight is generally in the range of 0.1% to 50%, preferably in the range of 1% to 30%, more preferably in the range of 5% to 25% by weight.

The catalyst can also contain other additional elements, for example activity promoters such as at least one element selected from the group formed by molybdenum and tantalum and/or reducibility promoters such as platinum, palladium or ruthenium. The amount by weight of additional element with respect to the total catalyst weight is generally in the range of 0.01% to 10%, preferably in the range of 0.05% to 7% by weight, more preferably in the range of 0.05% to 5% by weight. These additional elements are preferably introduced at the same time as the group VIII metal or, in a preferred variation, in at least one subsequent step.

In a particular implementation of the invention, the catalyst contains both cobalt and ruthenium. In a further particular implementation of the invention, the catalyst contains cobalt and tantalum.

The mechanical strength of the catalyst of the invention is improved with respect to a catalyst comprising a support constituted solely by alumina.

The mechanical strength of the catalyst of the invention can be determined by measuring the particle size at the end of a set test period during use of a three-phase reactor.

The following conditions are normally employed for said catalysts when synthesising hydrocarbons:

The catalyst comprising at least one group VIII metal impregnated on the support comprising the modified alumina described above is dried then calcined. The catalyst is then pre-reduced using at least one reducing compound, for example selected from the group formed by hydrogen, carbon monoxide and formic acid, optionally mixed with an inert gas, for example nitrogen, in a reducing compound/(reducing compound+inert gas) mole ratio in the range of 0.001:1 to 1:1.

Reduction can be carried out in the gas phase at a temperature in the range of 100° C. to 600° C., preferably in the range of 150° C. to 400° C., at a pressure in the range of 0.1 to 15 MPa, preferably in the range of 0.5 to 10 MPa, and at an hourly space velocity in the range of 100 to 40000 volumes of mixture per volume of catalyst per hour, preferably in the range of 500 to 2000 volumes of mixture per volume of catalyst per hour.

This reduction can also be carried out in the liquid phase, under the same operating conditions as in the gas phase, the catalyst then being suspended in an inert liquid phase (also known as the solvent), for example a paraffin cut comprising at least one hydrocarbon containing at least 5, preferably at least 10 carbon atoms per molecule.

When the catalyst, as is preferable, is used in a three-phase reactor, it may be advantageous to use, as is preferable, the same inert solvent as that used during the reaction. Highly preferably, a paraffin cut from the Fischer-Tropsch process is used, for example a kerosene or gas oil cut. Preferably, this reduction is carried out in situ, i.e., in the reactor that is then used to carry out the Fischer-Tropsch synthesis.

The catalyst used in the process of the invention can also be reduced ex situ or offsite, i.e., not in the Fischer-Tropsch synthesis reactor, or even outside the industrial site carrying out the process. Reduction can then optionally be carried out by an enterprise accustomed to carrying out offsite treatments.

In such a case, the catalyst is reduced under the operating conditions described above. After reducing and cooling the reduced catalyst to below 100° C., said catalyst is preferably mixed, in an amount of 10% to 80% by weight, with solid paraffin waxes at ambient temperature and pre-heated to liquefy the waxes. Preferably, paraffin waxes from a Fischer-Tropsch process are used. After mixing, the suspension obtained is drop coagulated by projecting onto a support belt followed by cooling. The product obtained is in the form of grains with an equivalent diameter (diameter of the sphere with a equivalent volume) in the range of about 5 to about 20 mm in diameter. These catalyst grains can be charged directly into the Fischer-Tropsch reactor.

The conversion of synthesis gas to hydrocarbons is then carried out under a total pressure that is normally in the range of 0.1 to 15 MPa, preferably in the range of 1 to 10 MPa; the temperature is generally in the range of 150° C. to 350° C., preferably in the range of 170° C. to 300° C. The hourly space velocity is normally in the range of 100 to 20000 volumes of synthesis gas per volume of catalyst per hour, preferably in the range of 400 to 5000 volumes of synthesis gas per volume of catalyst per hour ($h^{-1}$), more preferably in the range of 200 to 10000 $h^{-1}$, and still more preferably in the range of 400 to 5000 $h^{-1}$, and the $H_2/CO$ ratio in the synthesis gas is normally in the range of 1:2 to 5:1, preferably in the range of 1.2:1 to 2.5:1.

The catalyst may be used in the form of a fine calibrated powder with a grain size of less than 800 $\mu$m, preferably in the range of 10 to 500 $\mu$m (microns), more preferably in the range of 10 to 300 $\mu$m, and highly preferably in the range of 20 to 120 $\mu$m, when it is used in suspension in a liquid phase.

The process of the present invention can also be used with said catalyst disposed in a fixed bed. It is generally used in the form of particles with an equivalent diameter in the range of about 1 to 10 mm, preferably in the range of 2 to 8 mm. In such a process, the reaction takes place in the gas phase. The mechanical strength of the catalyst described above is sufficiently high for it to be manipulated and charged into such a reactor without risk of disintegration.

The process of the invention can also, as is preferable, be carried out in a three-phase reactor in which the catalyst is in suspension in an inert liquid phase (solvent). As an example, a perfectly stirred reactor such as an autoclave or a bubble column type three-phase reactor (also known as a slurry bubble column) can be used.

The catalyst is advantageously used in a three-phase reactor, preferably a slurry bubble column, as this type of operation can:

optimise catalyst performance (activity and selectivity), by limiting intra-granular diffusion phenomena;

substantially limit thermal effects in the catalyst grain, which is surrounded by a liquid phase.

This type of implementation requires that the catalyst an d reaction products be separated.

Said catalyst has an improved attrition resistance, and thus a substantial reduction in the amount of fines formed during use with a three-phase reactor.

The catalyst of the invention also has particularly stable performances in Fischer-Tropsch synthesis and results in conversion of the synthesis gas into a mixture of linear and saturated hydrocarbons containing at least 50% by weight, preferably at least 60% by weight and more preferably at least 70% by weight of C5+ hydrocarbons. Methane formation is limited to less than 20% by weight, preferably less than 10% by weight, more preferably less than 7% by weight of methane, with respect to the hydrocarbons formed.

In summary, the invention provides a process for converting synthesis gas in the presence of a catalyst comprising at least one group VIII element dispersed on a support comprising alumina modified by aqueous impregnation of quaternary ammonium silicate and comprising in the range of about 3% by weight to about 9.5% by weight of silica, preferably in the range of about 4% by weight to about 9.5% by weight of silica. The specific surface area of said support is optionally and preferably in the range of 160 to 250 $m^2/g$.

The catalyst in the process of the invention can also comprise at least one additional element selected from the group formed by molybdenum, tantalum, platinum, palladium and ruthenium. The amount of this additional element is preferably in the range of 0.01% to 10% by weight.

Highly preferably, the group VIII element in the catalyst of the invention is cobalt and the amount of cobalt in said catalyst is preferably in the range of 1% by weight to 30% by weight.

The support for the process of the invention can also comprise at least one oxide selected from the group formed by rare earth oxides, alkaline-earth oxides and zirconium oxide.

The support comprising alumina of the invention can optionally be in the form of a fine calibrated powder with a grain size of less than 800 $\mu$m and the catalyst is used in a three-phase reactor. Preferably, said three-phase reactor is a slurry bubble column.

The alumina used to prepare the support can also optionally be in the form of spheres or extrudates with an equivalent diameter in the range of 1 to 10 mm, and the catalyst is preferably used in a fixed bed reactor. More preferably, the alumina in the catalyst of the invention is a gamma alumina.

The following examples illustrate the invention.

EXAMPLE 1 (IN ACCORDANCE WITH THE INVENTION)

Catalyst A

Catalyst A, $Co/Si/Al_2O_3$, was prepared by
1. Impregnating an aqueous tetraethylammonium silicate solution onto a Condéa Scca 5–170 alumina support, drying at 120° C. and calcining at 700° C. The support obtained had a specific surface area of 172 $m^2/g$ and contained 5% by weight of $SiO_2$. It was in the form of a powder with a grain size in the range of 20 to 150 microns.
2. Impregnating the support obtained at 1 with cobalt nitrate. The catalyst from the impregnation step was dried and calcined at 400° C. The cobalt metal content was 13% by weight.

EXAMPLE 2 (IN ACCORDANCE WITH THE INVENTION)

Catalyst B

Catalyst B, $Co/Si-Zr/Al_2O_3$, was prepared by
1. Co-impregnating an aqueous tetraethylamrnonium silicate and zirconyl nitrate solution onto a Condéa Scca 5–170 alumina support, drying at 120° C. and calcining at 600° C.

The support obtained had a specific surface area of 165 $m^2/g$ and contained 5% by weight of $SiO_2$ and 3% by weight of $ZrO_2$.

It was in the form of a powder with a grain size in the range of 20 to 150 microns.
2. Impregnating the support obtained at 1 with cobalt nitrate. The catalyst from the impregnation step was dried and calcined at 400° C. The cobalt metal content was 12.5% by weight.

EXAMPLE 3 (COMPARATIVE)

Catalyst C

Catalyst C, $Co/Al_2O_3$, was prepared by impregnating cobalt nitrate into a Condéa Scca 5–170 alumina support with a specific surface area of 180 $m^2/g$. This support was in the form of a powder with a grain size in the range of 20 to 150 microns.

The catalyst from the impregnation step was dried and calcined at 400° C.

The final cobalt content was 12.5% by weight.

EXAMPLE 4 (COMPARATIVE)

Catalyst D

Catalyst D was prepared as follows:
1. Impregnation of TEOS (tetraethoxysilane) diluted in ethanol in a Condéa Scca 5–170 alumina powder with a specific surface area of 180 $m^2/g$;
2. Calcining at 550° C.;
3. Impregnating with cobalt nitrate, drying and calcining at 400° C.

The final catalyst contained 13% by weight of cobalt and 5% by weight of $SiO_2$.

EXAMPLE 5 (COMPARATIVE)

Catalyst E

Catalyst E was prepared as described in Example 1.

The support obtained had a specific surface area of 165 $m^2/g$ and contained 10% by weight of $SiO_2$.

After impregnating with cobalt nitrate, drying and calcining, catalyst E contained 13% by weight of cobalt.

EXAMPLE 6 (COMPARATIVE)

Catalyst F

Catalyst F was prepared as described in Example 1.

The support obtained had a specific surface area of 180 $m^2/g$ and contained 1.5% by weight of $SiO_2$.

After impregnating with cobalt nitrate, drying and calcining, catalyst F contained 13% by weight of cobalt.

EXAMPLE 7

Fixed Bed Catalytic Tests

Catalysts A, B, C, D, E, F, the preparations of which were described in Examples 1 to 6, were tested in a gas phase fixed bed in a unit functioning continuously and operating with 20 $cm^3$ of catalyst.

The catalysts were initially reduced in situ at 350° C. for 12 hours in a mixture of hydrogen and nitrogen containing 30% hydrogen, then for 12 hours in pure hydrogen.

The catalyst test conditions were as follows:

temperature=220° C.;

pressure=2 MPa;

hourly space velocity (HSV)=1500 $h^{-1}$;

$H_2$/CO mole ratio=2/1

TABLE 1

Conversion of synthesis gas into hydrocarbons

| Catalyst | CO conv (% vol after 100 h) | Distribution of products formed (weight %) | |
|---|---|---|---|
| | | C1 | C5+ |
| A (invention) | 65 | 11 | 75 |
| B (invention) | 66 | 12 | 76 |
| C (comparative) | 70 | 16 | 54 |
| D (comparative) | 68 | 21 | 64.5 |
| E (comparative) | 62 | 14 | 68 |
| F (comparative) | 70 | 15 | 54 |

The results of the table show that the yield of heavy products is improved in the process of the invention in the presence of a catalyst supported on silicated alumina.

EXAMPLE 8

Catalytic Tests in a Slurry Reactor

Catalysts A, B, C, D, E, F described in Examples 1 to 6 above were tested in a perfectly stirred slurry reactor functioning continuously and operating with a concentration of 10% (molar) of catalyst in suspension.

The catalyst test conditions were as follows:

T°C=230° C.;

pressure=2 MPa;

hourly space velocity (HSV)=1000 $h^{-1}$;

$H_2$CO mole ratio=2/1

TABLE 2

Conversion of synthesis gas into hydrocarbons

| Catalyst | CO conv (% vol after 100 h) | Distribution of products formed (weight %) | |
|---|---|---|---|
| | | C1 | C5+ |
| A (invention) | 55 | 11 | 78 |
| B (invention) | 57 | 10 | 76 |
| C (comparative) | 50 | 11 | 64 |
| D (comparative) | 49 | 12 | 66 |
| E (comparative) | 45 | 12 | 68 |
| F (comparative) | 50 | 12 | 63 |

The results show that catalysts A and B of the invention have an improved heavy product yield compared with prior art catalysts.

Further, after 500 hours of test, the grain size of the catalysts obtained after separating the reaction products was measured.

The table below shows the % of particles with a size of less than 20 microns formed when testing the 6 catalysts A, B, C, D, E and F.

TABLE 3

Mechanical strength

| Catalyst | % of particles less than 20 microns |
|---|---|
| A (invention) | 5 |
| B (invention) | 4 |
| C (comparative) | 10 |
| D (comparative) | 9 |
| E (comparative) | 8 |
| F (comparative) | 10 |

Catalysts A and B of the invention exhibited improved mechanical strength.

EXAMPLE 9

Catalysts A and C described in Examples 1 and 3 above were used in an apparatus comprising:

a slurry bubble column with an internal diameter of 50 mm and a height of 1500 mm;

a synthesis gas inlet pipe at the base of the column;

a suspension withdrawal pipe above the liquid level;

a suspension re-injection pipe at the base of the column;

a circulation loop comprising a degasser, a settler and a pump.

Catalyst A, introduced into the column in an amount of 500 g in 1.5 l of n-C18 paraffin, was used under the following conditions: Feed flow rate: 1 $m^3$/h of a CO+$H_2$ mixture (½ $H_2$/CO =2/1); T=220° C.; P=20 MPa.

The CO conversion was 70%; the C5+ selectivity was 76%.

The catalyst was separated from the products using the settler; the catalyst content in the liquid was less than 500 ppm by weight.

Catalyst C, used under the same conditions as those used for A, produced a CO conversion of 65% and a C5+ selectivity of 76%.

Settling in the same apparatus 0.15% by weight of catalyst to be detected in the liquid; it had to undergo subsequent filtration for recovery.

These examples illustrate the superiority of catalyst A in use in a slurry bubble column both from the reaction viewpoint and for recovery of the product and the mechanical strength of the catalyst.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/13.703, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for converting synthesis gas to C5+ hydrocarbons, said synthesis gas comprising carbon monoxide and hydrogen, said process comprising reacting said synthesis gas under conversion conditions in the presence of a catalyst comprising at least one group VIII element dispersed on a support comprising alumina impregnated with quaternary ammonium silicate and comprising in the range of about 3% by weight to about 9.5% by weight of silica.

2. A process according to claim 1, in which the support comprises in the range of about 4% by weight to about 9.5% by weight of silica.

3. A process according to claim 1, in which the specific surface area of said support is in the range of 160 to 250 m²/g.

4. A process according to claim 1, in which the support further comprises at least one oxide selected from the group consisting of rare earth oxides, alkaline-earth oxides and zirconium oxide.

5. A process according to claim 1, in which the catalyst also comprises at least one additional element selected from the group consisting of molybdenum, tantalum, platinum, palladium and ruthenium.

6. A process according to claim 5, in which the amount of the additional element is in the range of 0.01% to 10% by weight.

7. A process according to claim 1, in which the group VIII element is cobalt.

8. A process according to claim 1, in which the support comprising alumina is in the form of a fine calibrated powder with a grain size of less than 800 μm and conducting the conversion in a three-phase reactor containing the catalyst.

9. A process according to claim 8, in which the three-phase reactor is a slurry bubble column.

10. A process according to claim 1, in which the alumina used to prepare the support is in the form of spheres or extrudates with an equivalent diameter in the range of 1 to 10 mm, and conducting the conversion in a fixed bed reactor containing the catalyst.

11. A process according to claim 1, in which the alumina is a gamma alumina.

12. A process according to claim 7, in which the cobalt content is in the range of 1% by weight to 30% by weight.

13. A process according to claim 4, in which the catalyst also comprises at least one additional element selected from the group consisting of molybdenum, tantalum, platinum, palladium and ruthenium.

14. A process according to claim 4, in which the group VIII element is cobalt.

15. A process according to claim 5, in which the group VIII element is cobalt.

16. A process according to claim 13, in which the group VIII element is cobalt.

17. A process according to claim 16, in which the specific surface area of said support is in the range of 160 to 259 m²/g.

18. A process according to claim 1, wherein said hydrocarbons constitute a mixture of linear and saturated hydrocarbons containing at least 50% by weight of C5+ hydrocarbons and less than 20% by the weight of methane.

19. A process according to claim 18, wherein the hydrocarbons comprise at least 60% by weight of the C5+ hydrocarbon and less than 10% by weight of methane.

20. A process according to claim 18, wherein the hydrocarbons comprise at least 70% by weight of the C5+ hydrocarbon and less than 7% by weight of methane.

21. A process according to claim 1, wherein the alumina is impregnated with an aqueous solution of said quaternary ammonium silicate.

* * * * *

UNITED STATES PATENT AND TRADEMARK OFFICE
CERTIFICATE OF CORRECTION

PATENT NO.    : 6,515,035 B2
DATED         : February 4, 2003
INVENTOR(S)   : Magalie Roy-Auberger et al.

It is certified that error appears in the above-identified patent and that said Letters Patent is hereby corrected as shown below:

Column 10,
Line 36, reads "160 to 259" should read -- 160 to 250 --
Line 41, reads "20% by the weight" should read -- 20% by weight --
Lines 44 and 47, "hydrocarbon" should read -- hydrocarbons --

Signed and Sealed this

Sixteenth Day of March, 2004

JON W. DUDAS
*Acting Director of the United States Patent and Trademark Office*